United States Patent [19]

Peter et al.

[11] Patent Number: 4,543,193
[45] Date of Patent: Sep. 24, 1985

[54] PROCESS FOR PREVENTING THE PRECIPITATION OF ELEMENTARY SULPHUR IN RISER PIPES OF PROBES FOR NATURAL GAS

[76] Inventors: Siegfried Peter; Georg Hartel, both of Egerlandstrasse 3, 8520 Erlangen; Wolfgang Bruckhoff, Reithorst 12, 3000 Hannover 51, all of Fed. Rep. of Germany

[21] Appl. No.: 516,900

[22] Filed: Jul. 25, 1983

[30] Foreign Application Priority Data

Feb. 20, 1981 [DE] Fed. Rep. of Germany ....... 3106362

[51] Int. Cl.⁴ .............................................. E21B 37/00
[52] U.S. Cl. ............................... 252/8.55 B; 166/310; 423/243
[58] Field of Search ................ 252/8.55 B, 8.3; 299/5; 166/310; 423/243, 578 R

[56] References Cited

U.S. PATENT DOCUMENTS

| | | | |
|---|---|---|---|
| 2,179,065 | 11/1939 | Smith | 260/399 |
| 2,204,538 | 6/1940 | Lincoln et al. | 260/399 X |
| 2,357,559 | 9/1944 | Smith | 252/8.55 |
| 2,897,065 | 7/1959 | Capell et al. | |
| 3,498,887 | 3/1970 | McClintock et al. | 299/5 X |
| 3,531,160 | 9/1970 | Fisher | 299/5 |
| 3,835,927 | 9/1974 | Oude Alink et al. | 166/304 |
| 4,248,717 | 2/1981 | Sharp et al. | 252/8.55 |

FOREIGN PATENT DOCUMENTS 818799 10/1951 Fed. Rep. of Germany .
1129475 9/1956 France .

OTHER PUBLICATIONS

Schwab et al., Journal of the American Oil Chemists' Society, vol. 52, Jul. 1975, pp. 236–239.

*Primary Examiner*—Herbert B. Guynn
*Attorney, Agent, or Firm*—Wyatt Gerber Shoup

[57] ABSTRACT

Process for preventing the precipitation of elementary sulfur in the riser pipes of probes for natural gas including a solvent for sulfur. For the dissolution of the precipitating elementary sulfur an ester of an optionally mono- or poly-unsaturated fatty acid and/or the reaction product of $H_2S$ with an ester of a mono- or poly-unsaturated fatty acid, optionally in solution, is used. The solvent for sulfur is liquid under the conditions in the mining probe and only slightly soluble in the gas.

12 Claims, No Drawings

PROCESS FOR PREVENTING THE PRECIPITATION OF ELEMENTARY SULPHUR IN RISER PIPES OF PROBES FOR NATURAL GAS

RELATED APPLICATION

This application is a continuation in part of copending application Ser. No. 438,843 filed Oct. 19, 1982, now abandoned.

BACKGROUND OF THE INVENTION

In the various natural gas deposits containing gases with higher portions of hydrogen sulfide the reservoir rock is more or less impregnated with elementary sulfur. In these cases, gas collected at the well head contains elementary sulfur in an amount which is dependent upon pressure, temperature and composition. The solubility of the elementary sulfur in the gas increases with the content of hydrogen sulfide, the content of carbon dioxide, the temperature and pressure. The hydrogen sulfide content of acidic natural gases varies greatly. Hydrogen sulfide containing gases which will entrain appreciable amounts of elementary sulfur generally have an $H_2S$ content between 5 and 30% by volume. Normally, they also contain $CO_2$ in the same amount.

When mining the gas, its pressure and temperature decreases during the passage through the riser. The decrease of temperature and pressure is accompanied by a corresponding reduction in the solubility of the sulfur. The elementary sulfur precipitates and adheres to the wall of the riser in certain zones. If there is a major precipitation of the sulfur the riser is blocked in such a short time that mechanical measures for removing the precipitated sulfur are unsatisfactory because they are either too costly or the interruption of operations is too lengthy. Therefore means for the continuous dissolution of the precipitating sulfur have long been sought.

Several suggestions have been made to solve this technical problem. The principal measures employed in the mining technology are: (a) dissolution of the entrained elementary sulfur in aqueous solutions in the form of polysulfides (German Patent Specification No. 1 286 586), (b) dissolution of the entrained sulfur in high boiling hydrocarbons and dialkyl sulfides which are immiscible with the precipitating condensation water and the entrained water of the deposit respectively (German Patent Specification No. 1 173 856, U.S. Pat. No. 3,846,311).

The solvents, such as an ethylamine solution, spindle oil etc., are added to the rising natural gas stream at the mouth of the riser. After the gas exits the outlet of the well, the resulting sulfur solutions are separated by means of usual liquid separating agents. These same separation means may be employed in association with the process of this invention.

For the dissolution of the entrained sulfur in the form of polysulfides, low molecular weight amines, such as methylamine, dimethylamine, ethylamine, etc., are particularly suitable. The polysulfides may be dissociated by the removal of the amine and the hydrogen sulfide at about 140° C. with the formation of liquid sulfur. Amine and hydrogen sulfide are condensed together with the resultant steam and returned into the probe (German Patent Specification No. 1 286 586).

When higher amounts of deposit water containing calcium salts are entrained precipitates of calcium carbonate may result from the addition of amine solutions in the presence of $CO_2$ in the gas. These precipitates impair the mining operations and block the equipment.

In such cases water-insoluble organic colvents may be used. As hydrocarbons having an intermediate molecular weight are appreciably soluble in natural gas at the relatively high pressures in the deposits and during mining, hydrocarbons of high molecular weights which dissolve in the gas to a smaller extent are necessary. Suitable high molecular weight hydrocarbon fractions are, for instance, obtained as spindle oils during the vacuum distillation of mineral oils. The regeneration of the spindle oil is effected by extracting the sulfur utilizing aqueous solutions of sodium sulfide and sodium hydrogen sulfide respectively to produce sodium polysulfide.

A disadvantage when dissolving the entrained sulfur in the spindle oil is the low solubility of the sulfur at room temperature and the resulting high dependence on the temperature for operation of the process. At 30° C. only about 1% by weight of sulfur dissolves, while about 6% by weight dissolves at 90° C.

Clearly, it is desirable to limit the amount of circulating solvent. Therefore there is the need for an improved solvent for sulfur at low temperature.

THE INVENTION

A principal object of the present invention is the provision of a process and a sulfur solvent for the same in which process the above mentioned disadvantages of the prior art are avoided.

It is possible according to the invention to mine natural gases with a wide range of sulfur content, hydrogen sulfide and/or carbonic acid without difficulties resulting from the blockage of the riser or other transport pipes. This can be accomplished according to the inventors while utilizing the lowest possible amount of solvent for the sulfur and avoiding sulfur precipitates when the natural gases are cooled above-ground. Furthermore, the loss of the solvent for the sulfur during the intended utilization is minimized, and the sulfur solvent is easily regenerated and returned to the circuit for further use.

The process of this invention avoids the precipitation of elementary sulfur in the riser pipes or probes for natural gas through which gases containing hydrogen sulfide and/or carbonic acid pass during mining operations, which gases contain dissolved elementary sulfur. The process is characterized in that for the dissolution of the precipitating elementary sulfur an ester of an optionally mono- or poly-unsaturated fatty acid and/or a thioether or the reaction product of $H_2S$ with an ester of a mono- or poly-unsaturated fatty acid (henceforth called "$H_2S$/ester reaction product"), respectively optimally in solution, is used. The solvent for sulfur is present in liquid form under the conditions prevailing in the mining probe. It is only slightly soluble in the gas, and may be added to the gas stream at a suitable place.

More specifically, the process is one for dissolving sulfur in natural gas during the mining thereof employing an extractant which is called herein "solvent" for the sake of brevity It comprises the ester or mixture of esters of mono- or poly-unsaturated fatty acids; thioethers in which the ester molecules of fatty acids are joined to each other through a sulfur atom, or reaction products of esters of mono- or poly-unsaturated fatty acids and hydrogen sulfide.

As will be clear from the following description, the solvents may be used alone or they may be used as mixtures. Very conveniently, solvent esters are obtained by saponifying and esterifying naturally occuring fats and oils such as palm oil or safflower oil.

The solvent esters are the reaction products of alcohols and acids. E.g. the fatty acid components of the esters comprise alkene groups, and the alcohol components include alkyl groups. The groups may, however, be substituted with any of a number of functional groups which will be inert under the conditions of the extraction.

The fatty acid solvent esters and the thioethers, and the "H₂S/ester reaction products", respectively normally contain about 10 to 24 carbon atoms, preferably 12 to 22 carbon atoms, in the fatty acid component, while containing about 1 to 22 carbon atoms, preferably 1 to 12 carbon atoms, in the alcohol component. The alcohol component is preferably an isoalkyl group. Mono-unsaturated fatty acid esters or their H₂S/ester reaction products are preferred, although other esters containing two or more double bonds in the fatty acid component may also be employed. These are included in the term poly-unsaturated.

In a special embodiment of the invention, a solution of the solvent in a liquid, low volatile hydrocarbon solvent is used at a concentration of 10 to 90% by weight, preferably 20 to 60% by weight. Crude oil fractions having a boiling range of 300° to 450° C. and a viscosity range of 10 mPa.s to 100 mPa.s at 20° C., are preferred. However, a wide range of alkanes, cyloalkanes, and aromatic compounds and any mixtures thereof may be advantageously employed.

The esters of certain carboxylic acids are surprisingly good solvents for sulfur as utilized in accordance with the process of this invention. They dissolve the sulfur better than spindle oil. The esters of unsaturated fatty acids will generally be preferred because they are less viscous at low temperatures. Furthermore, the esters of unsaturated fatty acids may react with H₂S presumably forming mercaptans and thioethers as it is described below. These H₂S/ester reaction products generally possess an even better dissolving capacity for sulfur than the fatty acid esters per se.

It is known that hydrogen sulfide may be introduced into olefins at the double bonds contained therein. The addition normally occurs according to Markownikow's rule, i.e. at secondary and tertiary carbon atoms.

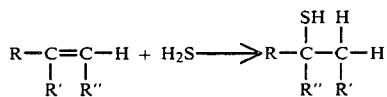

R' being hydrogen or alkyl,
R" being an esterified carboxylic group or an alkyl radical containing the same.

The mercaptans resulting therefrom may further react with olefins to form thioethers, an excess of mercaptans favoring the formation of thioethers (Beilstein, 83, 13 38 29 n). An excess of hydrogen sulfide, high pressure and temperatures of 150° to 300° C. favors the formation of mercaptans. From J. Am. Soc. 60, 2452 (1938) it is known to effect the H₂S addition to olefins by heating to 180° C. in an autoclave for 10 hours with addition of sulfur as catalyst. In J. Am. Oil Chem. Soc. 52 (1975), 7, 236 the addition of H₂S to methyl oleate, methyl linoleate and soy oil at −70° C. and 25° C. with boron trifluoride as catalyst is described. The main product from the reaction with methyl oleates was 9(10)-mercapto stearate. If equal amounts of methyl oleate and methyl-9(10)-mercapto stearate are used at 25° C. in the presence of BF₃ a new component results, viz. bis-(methyl-n-octadecanoate-9(10)-yl)-sulfide, which is the thioether of the stearic acid methyl ester.

With respect to these reactions, it is believed that the H₂S/ester reaction products used in the claimed process are mainly thioethers, and in the following description of the present invention the term "thioether" is sometimes used to describe these H₂S/ester reaction products.

Particularly suitable for the process of the present invention are esters of oleic acid, of fatty acids, of mixed oils, of fish fatty acid, fatty acids of soy oil, of palm oil and of rape oil and/or the corresponding products resulting therefrom by reaction with H₂S.

So, e.g. in the reaction between H₂S and an oleic acid ester, the double bond is lost and the thioether of stearic acid ester is obtained. The thioether obtained by reaction of H₂S with methyl oleate, e.g. dissolves about 7.5% by weight of sulfur at 50° C. and 14% by weight at 100° C. At 50° C. the dissolution capacity of the methyl stearate thioether is about as high as that of spindle oil at 90° C. The thioether is liquid at room temperature and easily pumpable. Its solidying point is −18° C. It is of further advantage that the solubility of the thioether in methane at high pressures is considerably lower than that of the spindle oil. And also the thioether resulting from the reaction of H₂S with decyl oleate is, e.g. an excellent solvent for sulfur. This thioether dissolves about 7% by weight of sulfur at 50° C. and 13% by weight at 100° C. In comparison, the saturation concentration of sulfur in spindle oil at 50° C. is about 2% by weight and about 6% by weight at 90° C. The thioether of decyl stearate is liquid at room temperature and easily pumpable. Its solidifying point is −2° C. A further advantage is that at elevated pressures the solubility of the thioethers of fatty acids esters in the gas is substantially lower than that of spindle oil.

A further advantage is provided by the use of novel sulfur solvents, such as the thioether of decyl stearate during the regeneration by extraction of sulfur as polysulfide. After mixing with an aqueous solution of, e.g. ethyl ammonium sulfide and ethyl ammonium hydrogen sulfide or analogous alkyl sulfides in which the alkyl group contains up to 6 carbon atoms, preferably 1 or 2, , to extract the sulfur this thioether of decyl stearate separates from the aqueous phase more easily than spindle oil. Therefore, smaller separators may be employed, and the circulated volume of solvent is lower.

With respect to the solidifying point, mixtures of thioethers of methyl stearate and decyl stearate are particularly advantageous. Thus, e.g. a mixture of the thioether of methyl stearate and the thioether of decyl stearate in a ratio of 1:1 has a solidifying point of −20° C. The viscosity of the mixture has the same value as the pure components.

A further example of an ester to be used according to the present invention is the isodecyl ester of fish fatty acid. It dissolves 6.5% by weight of sulfur at 20° C. and 18% by weight at 100° C. In comparison, the saturation concentration of the sulfur in spindle oil at 20° C. is about 0.25% by weight and about 7.5% by weight at 100° C. The isodecyl ester of fish fatty acid is liquid at room temperature and easily pumpable. Its solidifying point is −20° C. When H₂S reacts with the isodecyl fish fatty acid ester at 140° C. and partial pressures of H₂S of about $15 \times 10^5$ to $20 \times 10^5$ Pa, which corresponds to the conditions in the deposits of a series of natural gas fields, the corresponding thioesters result as described above. In this connection, the sulfur solubility is increased to 8.5% by weight at 20° C. and 18.5% by weight at 100° C. The solidifying point of the thioether of isodecyl fish fatty acid ester is −17° C. Due to the high molecular weight, the isodecyl fish fatty acid esters and particularly its thioether is only very slightly soluble in the gas under the high pressures in the deposit, so that there are almost no solvent losses, and the danger of impairing the subsequent gas wash steps is very low.

In further special embodiments of the present invention, the esters of fatty acids of fish oil, of soy oil, of safflower oil, of linseed oil, of rape oil, of tallow oil and their mixtures are used as solvents for sulfur. The solidifying points of said compounds are in the range of −1° C. to −20° C. The viscosity of the thioethers is of the same order as that of spindle oil. So, e.g. at 40° C. the viscosities of spindle oil are 7.3 mPa.s, of the thioether of methyl stearate 20 mPa.s, of the thioether of a fish fatty acid methyl ester 16 mPa.s (Estol 1505 ®), of the thioether of a mixed oil fatty acid methyl ester 7.5 mPa.s (Prichem 3778 ®).

In a further modification of the process it was found that the regeneration of the sulfur solvent by extraction of the sulfur using aqueous alkyl ammonium sulfide or alkyl ammonium hydrogen sulfide solutions is of great advantage. Sulfur which is present in the solvent in crystalline form is quickly and completely extracted. Especially suitable for the regeneration are alkyl amines, the alkyl groups of which contain 1 to 6 carbon atoms. Mono- as well as di- and tri-substituted amines are suitable. The mono- and di-substituted compounds containing 2 to 4 carbon atoms in the alkyl groups are preferred.

For an improved separation of extract phase and raffinate phase and thus a reduction of the liquid volume in the extractor emulsion, breakers (demulgators), such as Separol 22 ®, Dissolvan 4490 ® etc., may be added in small amounts. Due to the favorable behavior in the phase separation, aqueous amine solutions with a concentration in the range of 20 to 40% by weight are preferred for the sulfur extraction. The addition of corrosion inhibitors to the organic phase does not interfere with the sulfur extraction by means of aqueous alkyl ammonium sulfide solutions.

The aqueous alkyl ammonium-polysulfide solutions resulting from the extraction of sulfur from the organic phase may be decomposed by distillation at 120° to 150° C., preferably at 135° to 145° C., and at $1.5 \times 10^5$ to $5 \times 10^5$ Pa pressure, preferably $1.5 \times 10^5$ to $4 \times 10^5$ Pa, as described in detail in German Patent Specification No. 1 296 586 which is incorporated by reference. The elementary sulfur dissolved as polysulfide precipitates in liquid form. The distillate obtained in the decomposition consists of a concentrated solution of alkyl ammonium sulfide in water, which solution, if necessary, may be adjusted by admixing with water to a concentration optimum for the extraction and returned into the extraction cycle.

The regeneration of the solvent esters or their mixtures loaded with sulfur may be achieved according to the present invention also by cooling the solutions which leave the bore hole with temperatures of 80° to 100° C. down to temperatures in the range from 0° to 50° C., preferably to 20° to 30° C. The sulfur which crystallizes during cooling may be separated from the solvent by precipitation with subsequent decantation, filtration or centrifugation.

The reaction products of $H_2S$ with unsaturated fatty acid esters employed in the present invention, may be prepared by reacting the corresponding starting material in an autoclave under conditions similar to those in the mining probe for acidic natural gases. For this the ester of an unsaturated fatty acid, elementary sulfur and some aqueous amine solution are added into an autoclave. Then hydrogen sulfide is introduced into the autoclave up to a pressure of 18 atm. In a suitable method of operation the vessel containing the ester, sulfur and aqueous amine solution is filled with carbon dioxide up to $34.4 \times 10^5$ Pa, with nitrogen up to $44.5 \times 10^5$ Pa and with methane up to $122 \times 10^5$ Pa in this order. The composition of the gas then corresponds to about 15% by volume of $H_2S$, 13% by volume of $CO_2$, 8% by volume of $N_2$ and 64% by volume of $CH_4$. The autoclave is then heated to 140° C.

At this temperature stirring is effected for 30 hours. After cooling the autoclave the gas is vented. The obtained thioether of the unsaturated fatty acid ester is washed with a 40 percent aqueous amine solution to remove excess sulfur and $H_2S$.

The solubility of the elementary sulfur in the fatty acid esters and their thioethers respectively, according to this invention, is in part so high that in some cases it cannot be totally utilized due to difficulties in the uniform addition of small amounts to the gas stream. Therefore, it may be of economic advantage to use solutions of fatty acid esters or their thioethers in difficultly volatile hydrocarbons or difficultly volatile liquid fats to dissolve the entrained sulfur in the probe. The requirements in the low volatile hydrocarbons used are not very high. As, e.g. by addition of the thioether of the stearic acid methyl ester the solidifying point is decreased considerably the deparaffination of the low volatile hydrocarbon used as solvent for the thioether may be omitted.

As hydrocarbon which can be admixed with the compounds according to the present invention, crude oil fractions having a boiling range of about 300° to 450° C. are suitable.

The following non-limiting examples are given by way of illustration only.

EXAMPLE 1

The gas to be mined may have the following composition: 14% by vol. of hydrogen sulfide, 8.5% by vol. of $CO_2$, 4.5% by vol. of nitrogen, 73% by vol. of methane. In the deposit having a depth of 3,700 m, the temperature is about 145° C. The gas pressure is 390 atm. The deposit contains so much elementary sulfur that the gas is saturated with sulfur to about 2.5 g per m³ (Vn). The gas is mined through a 3½ inch riser pipe contained in a 5 inch mantle pipe. Through the ring interval between riser pipe and 5 inch mantle pipe the thioether of methyl stearate is added to the rising gas stream at the riser pipe mouth. The press rate is 200 l/h at a gas mining rate of 8,000 m³/h (vn). In the high pressure separator above ground 200 l/h of a solution of about 100 g of sulfur per liter of bis-(methyl-n-octadecanoate-9(10)-yl)-sulfide are obtained. The thioether of the stearic acid methyl ester is regenerated by extraction of the dissolved elementary sulfur with an aqueous solution of 40% by weight of ethyl ammonium sulfide at about 30° C. and recycled into the riser probe in the cycle. The aqueous ethyl ammonium polysulfide solution is decomposed by distillation at 140° C. and about 4 atm pressure. The sulfur which is dissolved as polysulfide precipitates in liquid form. The distillate consisting of ethyl ammonium sulfide and water obtained from the decomposition is available as extractant for the regeneration of the thioether of the stearic acid methyl ester.

EXAMPLE 2

The gas to be mined may have the following composition: 5% by vol. of $H_2S$, 40% by vol. of $CO_2$, 4% by vol. of $N_2$, 51% by vol. of methane. In the deposit at a depth of about 3,700 m, the temperature is about 145° C. The deposit contains so much elementary sulfur that the gas is saturated with sulfur to about 2 g of sulfur per $m^3$ (Vn). The gas is mined through a $3\frac{1}{2}$ inch riser pipe which is contained in a 5 inch protective pipe. Through the ring space between riser pipe and protective pipe a solution of 50% by weight of thioether, resulting from the reaction of $H_2S$ with mixed oil fatty acid methyl ester in a low volatile hydrocarbon (e.g. spindle oil) is added to the rising gas stream at the outlet of the deposit. The press rate of the thioether solution is 500 l/h at a gas mining rate of 12,000 $m^3$/h (Vn). The solution of the thioether obtained in the high pressure separator above ground contains about 50 g of elementary sulfur dissolved per liter. The solution is separated from the entrained deposit water and regenerated by extracting the dissolved sulfur by means of an aqueous solution of 30% by weight ethyl ammonium sulfide at about 40° C. The regenerated thioether solution is recycled into the mining probe. The aqueous ethyl ammonium-polysulfide solution obtained in the extraction is decomposed by distillation at 140° C. and about 4 atm pressure (according to German Patent Specification No. 1 296 586 which is incorporated by reference). The sulfur which is dissolved in the polysulfide precipitates in liquid form. The distillate of ethyl ammonium sulfide and water obtained in the decomposition is adjusted with fresh water to a concentration of 30% by weight which is desired for the extraction and returned into the extraction process.

EXAMPLE 3

The gas to be mined may have the following composition: 5% by vol. of $H_2S$, 40% by vol. of $CO_2$, 4% by vol. of $N_2$, 51% by vol. of methane. In the deposit in a depth of about 3,700 m, the temperature is about 145° C. The deposit contains so much elementary sulfur that the gas is saturated with sulfur to about 2 g of sulfur per $m^3$ (Vn). The gas is mined through a $3\frac{1}{2}$ inch riser pipe contained in a 5 inch protection pipe. Through the ring space between riser pipe and protection pipe a mixture of the thioethers of methyl stearate and decyl stearate in a ratio of 1:1 is added to the rising gas stream at the riser pipe mouth. The introduction rate of the thioether mixture is 300 l/h at a mining rate of the gas of 12,000 $m^3$/h (Vn). The thioether mixture obtained in the high pressure separator above ground contains about 80 g of elementary sulfur dissolved per liter. It is separated from the entrained deposit water and regenerated by extraction of the dissolved sulfur by means of an aqueous solution of 30% by weight of ethyl ammonium sulfide at about 40° C. The regenerated thioether mixture is recycled into the mining probe. The aqueous ethyl ammonium-polysufide solution obtained in the extraction is decomposed by distillation at 140° C. and about 4 atm pressure (according to the above mentioned German Patent Specification No. 1 296 586). The sulfur which is dissolved in the polysulfide precipitates in liquid form. The distillate of ethyl ammonium sulfide and water obtained in the decomposition is adjusted with fresh water to a concentration of 30% by weight which is desired for the extraction and returned into the extraction process.

EXAMPLE 4

The gas to be mined may have the following composition: 15% by vol. of $H_2S$, 13% by vol. of $CO_2$, 8% by vol. of $N_2$, 64% by vol. of $CH_4$. In the deposit in a depth of 3,700 m, the temperature is about 145° C. The gas pressure is 390 atm. The deposit contains so much elementary sulfur that the gas is saturated with sulfur to about 2 g of sulfur per $m^3$ (Vn). The gas is mined through a $3\frac{1}{2}$ inch riser pipe which is contained in a 5 inch mantle pipe.

Through the ring space between riser pipe and 5 inch pipe a mixture of thioethers obtained by the reaction of $H_2S$ with fish oil acid methyl ester and fish oil acid decyl ester is added to the rising gas stream at the riser pipe mouth. The introduction rate is 200 l/h at a gas mining rate of 10,000 $m^3$/h (Vn). In the high pressure separator above ground 210 l/h of a solution having about 100 g of sulfur per liter of solvent mixture is obtained. Said mixture is separated from the entrained deposit water and regenerated by extracting the dissolved sulfur by means of an aqueous solution of 20% by weight of ethyl ammonium sulfide at about 40° C. and recycled into the mining probe. The regeneration of the ethyl ammonium/polysulfide solution obtained in the extraction of sulfur may be effected as described in Example 1.

We claim:

1. A process for preventing the precipitation of elementary sulfur from natural gas which may contain hydrogen sulfide and/or carbonic acid together with elementary sulfur during the mining of the gas which comprises dissolving the sulfur in a solvent which is selected from the group consisting of esters of mono- or poly-unsaturated fatty acids; thioethers of said esters or mono- or poly-unsaturated fatty acids; the mixed reaction products of hydrogen sulfide and said esters or mono- or poly-unsaturated fatty acids in the presence of elementary sulfur; and mixtures thereof, said solvent being optionally used in form of a solution wherein said solvent contains 10 to 24 carbon atoms in the fatty acid component and 1 to 22 carbon atoms in the alcohol component.

2. A process as in claim 1 in which the solvent is employed as a solution in a hydrocarbon solvent of low volatility.

3. A process as in claim 2 wherein the hydrocarbon solvent is a crude oil fraction with a boiling range from 300° C. to 450° C. and a viscosity range from 10 mPa.s to 100 mPa.s.

4. A process as in claims 2 or 3 in which the concentration of the solvent in the hydrocarbon solvent of low volatility is from 10% to 90% by weight.

5. A process as in claims 2 or 3 in which the concentration of the solvent in the hydrocarbon solvent of low volatility is from 20% to 60% by weight.

6. A process as in claims 1, 2 or 3 in which the solvent contains from 12 to 22 carbon atoms in the fatty acid component and 1 to 12 carbon atoms in the alcohol component.

7. A process as in claims 1, 2 or 3 in which the fatty acid component of the solvent is oleic acid.

8. A process as in claims 1, 2 or 3 in which the fatty acid component of the solvent are the fatty acids of fish fatty acid.

9. A process as in claims 1, 2 or 3 in which the fatty acid component of the solvent are the fatty acids of soy oil.

10. A process as in claims 1, 2 or 3 in which the fatty acid component of the solvent are the fatty acids of palm oil.

11. A process as in claims 1, 2 or 3 in which the fatty acid component of the solvent are the fatty acids of rape oil.

12. A process as in claims 1, 2 or 3 including the additional step of extracting the solvent with aqueous alkyl ammonium sulfide or alkyl ammonium hydrogen sulfide solution to regenerate the solvent.

* * * * *